Oct. 25, 1955  P. L. TORRE  2,721,745
STEEL PIPE FRAME FOR MOTORCYCLES
Filed Aug. 14, 1950  2 Sheets-Sheet 1
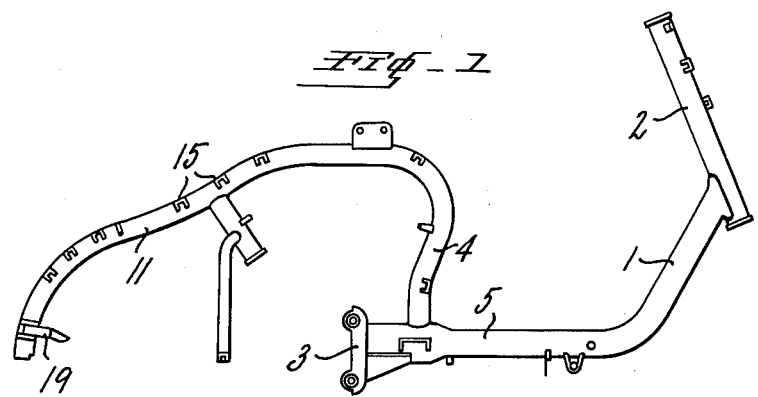
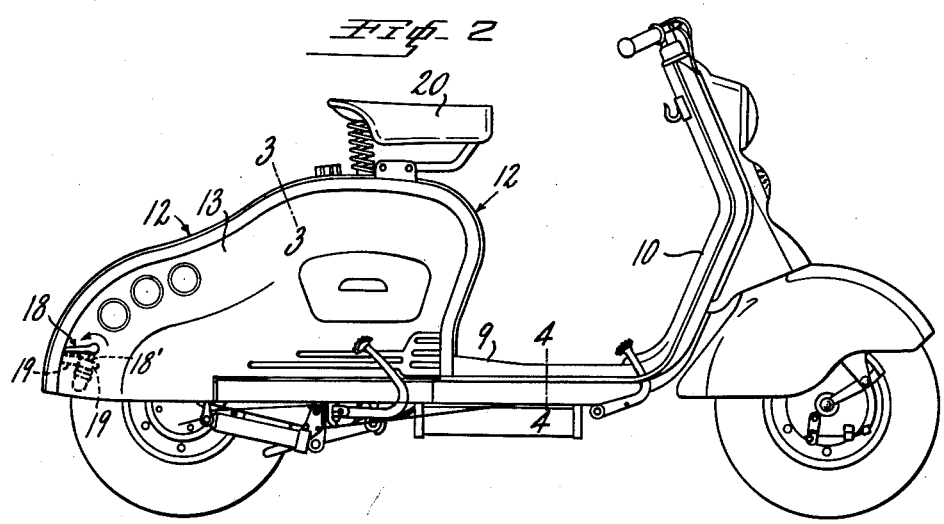
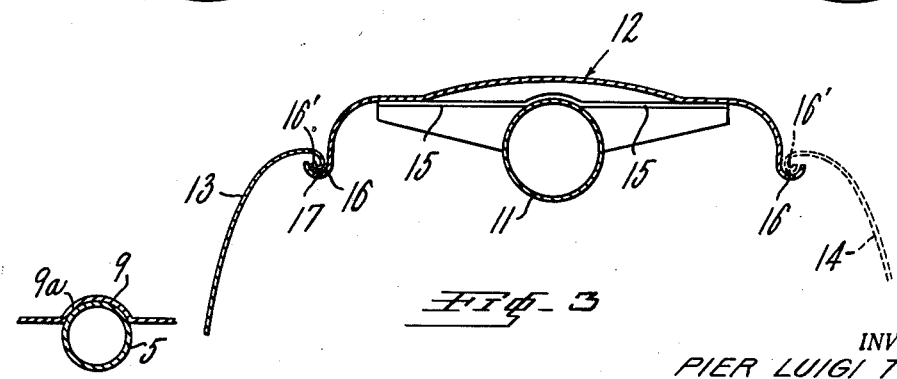
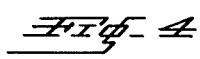
INVENTOR.
PIER LUIGI TORRE
BY

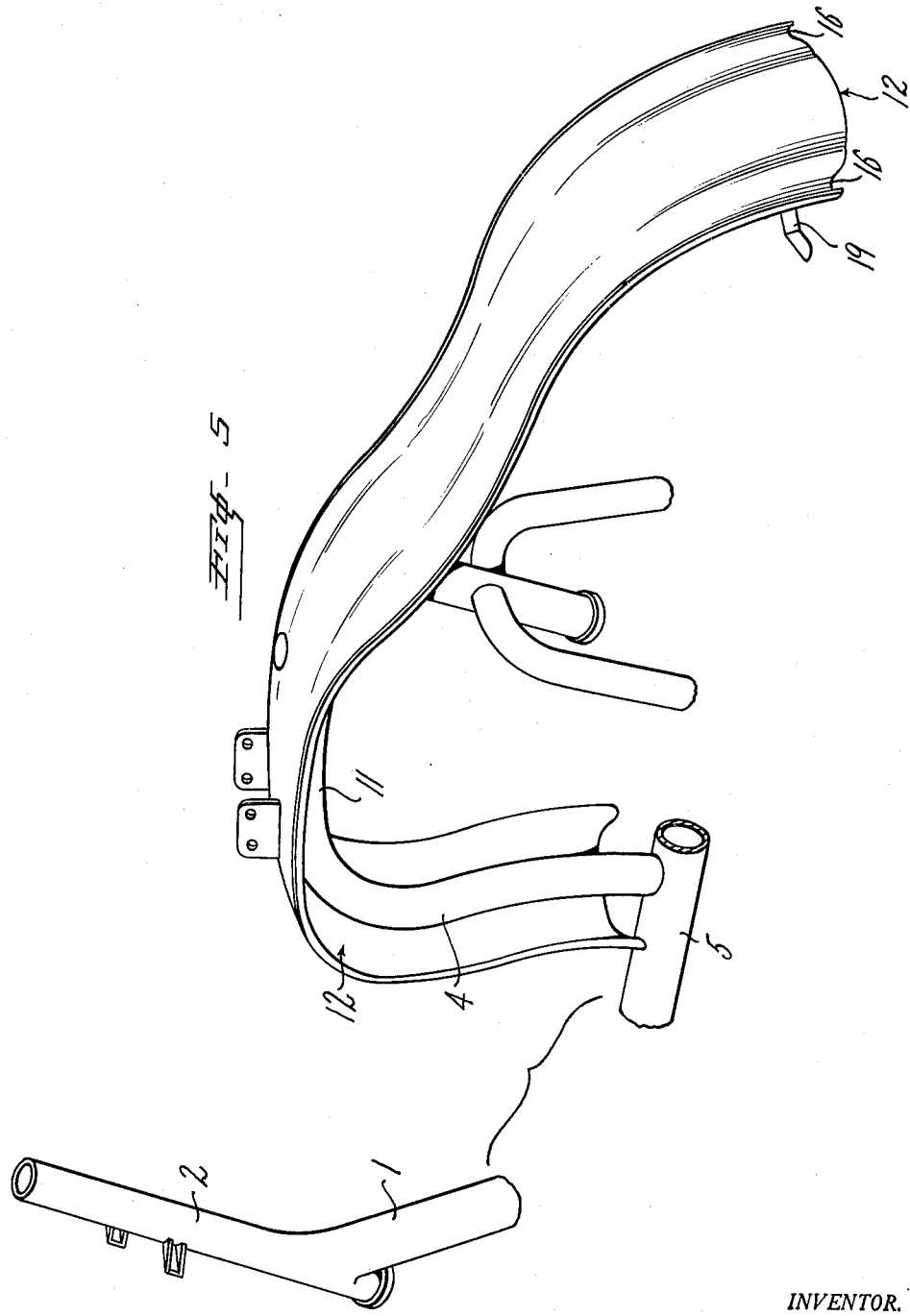

United States Patent Office 2,721,745
Patented Oct. 25, 1955

2,721,745
STEEL PIPE FRAME FOR MOTORCYCLES
Pier Luigi Torre, Milan, Italy
Application August 14, 1950, Serial No. 179,210
Claims priority, application Italy November 11, 1949
3 Claims. (Cl. 280—281)

The present invention relates to motorcycles, and more particularly to a small size motorcycle of the motor-scooter type, the frame of which is constituted by suitably bent pipe elements forming the main part whereon other essential parts (footrest, seat, etc.) of the motorcycle are supported.

Accordingly, it is an object of the invention to provide means affording a motorcycle frame structure constructively independent from other motorcycle parts or components which may be varied in shape and have different configurations. It is a remarkable advantage of the invention to provide means facilitating distribution of the assembly work over various departments in each of which the respective component parts are completely finished and then readily assembled in the assembly shop.

The above and still further objects of the present invention will become apparent upon consulting the following detailed description of the invention taken in conjunction with the drawings, wherein:

Fig. 1 is a side elevational view of the tubular main supporting frame made according to the invention and employable for a motorcycle shown completely assembled in Fig. 2.

Fig. 3 represents on an enlarged scale a section taken along line 3—3 in Fig. 2.

Fig. 4 shows an enlarged sectional view taken along 4—4 of Fig. 2.

Fig. 5 is a perspective view of the central rib as applied to the rearward part of the motorcycle frame.

According to the embodiment shown in Figs. 1 and 2, the frame comprises a main pipe 1 on the foremost part of which there is welded the steering head sleeve 2. Pipe 1 is provided with a horizontal portion 5 on the rear end of which is fixed terminal 3 fabricated of steel sheet. The terminal 3 constitutes the attachment for supporting an engine (not shown). Horizontal portion 5 fits with a groove 9a provided on the foot board 9 so that the latter has effective support on the frame. The foot board 9 may thus carry with a remarkable safety factor the weight of the driver. Footboard 9 is integral with the front apron 10 which is bent upwards, and constitutes a protective guard for the driver. The guard follows the line of the frame, without preventing the cooling air from reaching the engine, so that no special cooling arrangements are necessary or needed.

On the horizontal portion 5 of the frame there is secured a tubular-shaped, curved pipe element 4 (see Fig. 1). Embracingly received by and placed within the space defined by the curved pipe 4 may be fitted a gasoline reservoir (not shown), which may have a longitudinal groove which conforms to the contour of pipe 4 so as to be perfectly anchored thereon in all directions. All other components or pieces of the motorcycle, such as the seat 20, are assembled in the usual way and are linked or connected with the pipe 1, 4 constituting the elongated tubular frame structure, which extends in a single vertical plane common to all tubular elements or pipe sections.

The embodiment shown in Figs. 1 and 2 is shaped to facilitate the attachment thereto of a fairing 12, 13, 14. To accomplish this, tubular element 4 extends rearwardly in the form of tubular element or pipe 11 whereon is secured the aforesaid fairing for covering the rear wheel and engine forwardly of the latter. The fairing or hood is constructed in three parts, namely, two side hood parts 13, 14 and a central rib 12. The central rib 12 is fixed on small laterally projecting brackets 15, which are welded on bearing forming pipe portion 11, said rib terminating at both sides in a respective gutter 16 (Fig. 5). Within said gutters 16 fits the bent-over edge 16' of each of said side plates 13, 14 with packing means 17 interposed therebetween. The streamlined fairing is assembled first by aligning each bent-over edge with a respective gutter 16, then by rotating each side part 13, 14 about the foremost part of pipe 4 which is slanted while inserting each bent-over edge 16' within each gutter so as to prevent the loosening of the side plates, and by finally securing each side plate in position by means of cam latch 18 actuatable to removably engage lug 19 by means of a stem 18' (movable in the direction of the arrow of Fig. 2).

The fairing is thus fixed in an easily removable way so as to make the inside quickly accessible.

Also all the other parts of the motorcycle are easily disassemblable so as to make them quickly accessible for repairs.

Although a specific embodiment of the invention has been described and shown in the drawing, it should be noted that the invention may be realized in modified form and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. In a motorcycle having components including a footrest, front and rear wheels, and a seat; an elongated tubular frame composed of tubular elements directly connected with each other, all of said elements extending in a single vertical plane common to all said elements and being adapted to, respectively, support said components, said elements including an intermediate tubular horizontal portion and a front portion obliquely directed with respect to and connected to said horizontal portion at the front end of the latter, an inverted U-shaped rearward tubular element extending vertically from the rear end of said horizontal portion and preshaped for supporting said rear wheel and further said seat above a location intermediate the ends of said rearward tubular element, said horizontal portion forming a support for said footrest, a steering sleeve secured to said front portion and formed to support said front wheel, means provided on said rear end of said horizontal portion for securing an engine to said frame rearwardly of said horizontal portion and forwardly of said rear wheel, said rearward tubular element forming a bearing, a hood comprising a central supporting rib fixed to said bearing, and opposed side plates detachably secured to said rib and cooperating therewith to house said rear wheel.

2. A motorcycle according to claim 1, wherein said central supporting rib terminates on both lateral ends in a gutter, each of said side plates being formed with a counter-fitting bent-over edge receivable within the respective adjacent gutter of said central supporting rib.

3. A motorcycle according to claim 2, including bracket means fixed to said rearward tubular element and projecting laterally therebeyond to facilitate securement of said central supporting rib to said bearing.

References Cited in the file of this patent

UNITED STATES PATENTS

| | | |
|---|---|---|
| 1,511,631 | Page | Oct. 14, 1924 |
| 2,111,691 | Salsbury | Mar. 22, 1938 |
| 2,237,677 | Lewis | Apr. 8, 1941 |
| 2,286,575 | Ronning | June 16, 1942 |
| 2,384,110 | Malmquist | Sept. 4, 1945 |